United States Patent
Kawarada et al.

(10) Patent No.: US 6,837,679 B2
(45) Date of Patent: Jan. 4, 2005

(54) GAS TURBINE ENGINE

(75) Inventors: Satoshi Kawarada, Wako (JP); Toyotaka Sonoda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/240,107

(22) PCT Filed: Dec. 22, 2000

(86) PCT No.: PCT/JP00/09150
§ 371 (c)(1),
(2), (4) Date: Jan. 24, 2003

(87) PCT Pub. No.: WO01/75276
PCT Pub. Date: Oct. 11, 2001

(65) Prior Publication Data
US 2003/0143079 A1 Jul. 31, 2003

(30) Foreign Application Priority Data
Mar. 27, 2000 (JP) .......................... 2000-90730

(51) Int. Cl.$^7$ ................................ F01D 9/02
(52) U.S. Cl. ................. 415/191; 415/208.2; 416/193 A
(58) Field of Search .......................... 416/189, 193 R, 416/193 A; 415/191, 208.2

(56) References Cited

U.S. PATENT DOCUMENTS

| 4,465,433 A | * | 8/1984 | Bischoff | 416/223 A |
| 5,466,123 A | | 11/1995 | Rose | |
| 5,653,580 A | | 8/1997 | Faulder et al. | |
| 6,077,035 A | * | 6/2000 | Walters et al. | 415/115 |
| 6,283,713 B1 | * | 9/2001 | Harvey et al. | 416/193 A |
| 6,561,761 B1 | * | 5/2003 | Decker et al. | 415/173.1 |

FOREIGN PATENT DOCUMENTS

| JP | 57-35102 A | 2/1982 |
| JP | 63-63503 U | 4/1988 |
| JP | WO 96/00841 A | 1/1996 |
| JP | 11-241601 A | 9/1999 |

* cited by examiner

Primary Examiner—Ninh H. Nguyen
(74) Attorney, Agent, or Firm—Birch, Stewart, Kolasch & Birch, LLP

(57) ABSTRACT

A gas turbine engine has, in a cross section in the axial direction of an annular inner peripheral wall connected to a blade main body of a turbine blade, a concave part and a convex part on the front edge side and the rear edge side. The concave part has a negative curvature and is concave toward the axis, and the convex part has a positive curvature and is convex away from the axis. The flow rate on the upper face of the blade main body can be reduced in the concave part on the front edge side, thus suppressing generation of a shock wave, and the flow rate can be increased in the convex part on the rear edge side following the concave part, thus smoothly changing the flow rate on the upper face of the blade main body and thereby minimizing the pressure loss. In this way, the thickness of the blade main body can be reduced while ensuring the performance of the gas turbine engine, thereby contributing to a reduction in weight.

7 Claims, 2 Drawing Sheets

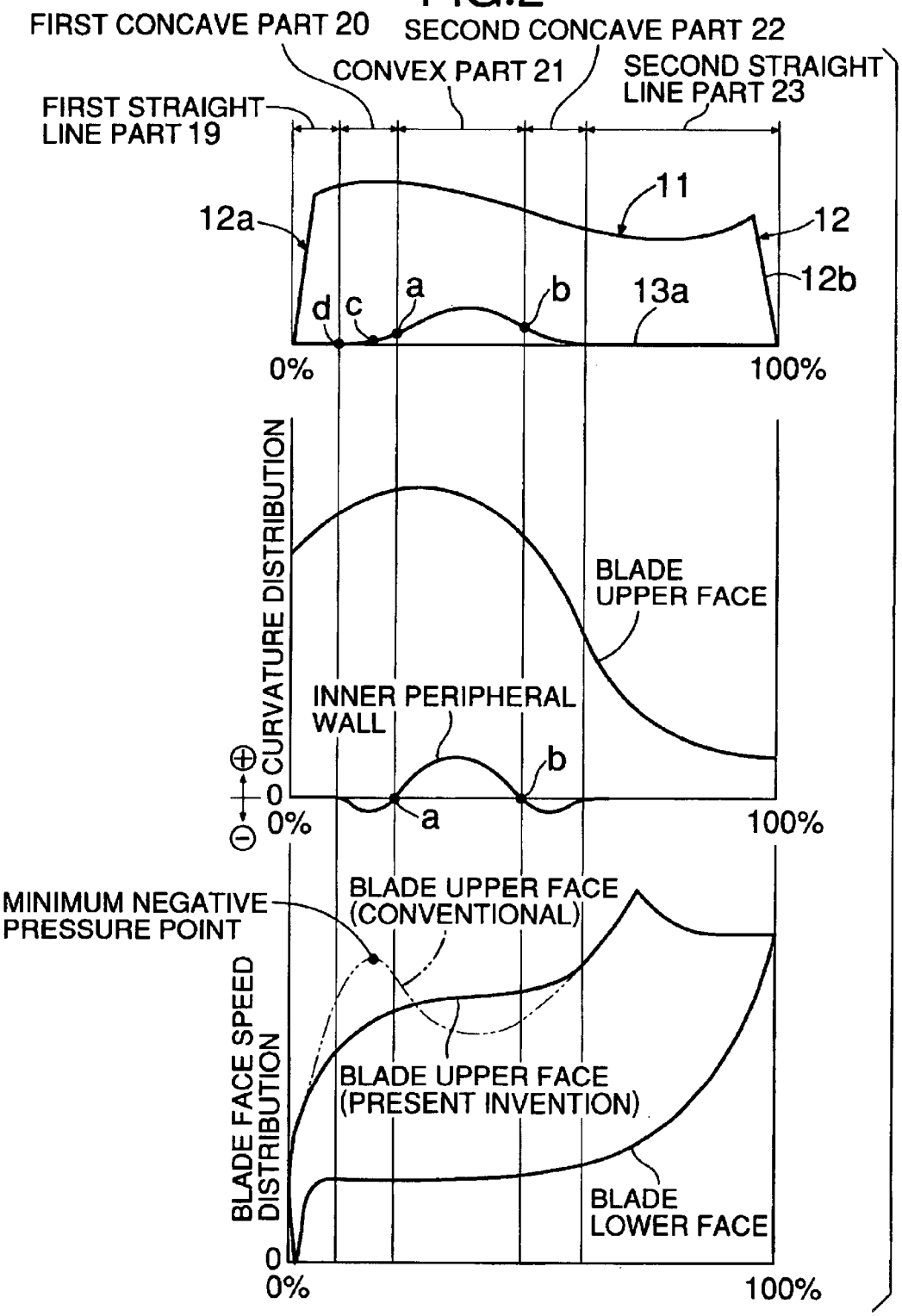

GAS TURBINE ENGINE

This application is the national phase under 35 U.S.C. §371 of PCT International Application No. PCT/JP00/09150 which has an International filing date of Dec. 22, 2000, which designated the United States of America.

FIELD OF THE INVENTION

The present invention relates to a gas turbine engine in which turbine airfoils are disposed in a radial direction in an annular gas passage defined by an inner peripheral wall and an outer peripheral wall.

BACKGROUND ART

Japanese Patent Application Laid-open No. 11-241601 discloses an axial-flow gas turbine engine comprising stator vanes and rotor blades, wherein a cross section in the axial direction of an inner peripheral wall of a casing to which the stator vanes and the rotor blades are connected has a concave part that recedes radially inward relative to a straight line joining the front edge of the root of the stator vane on the front side and the rear edge of the root of the rotor blade on the rear side.

Furthermore, U.S. Pat. No. 5,466,123 discloses an arrangement in which a cross section orthogonal to the axial direction of an inner peripheral wall of a casing supporting stator vanes of a gas turbine engine has sinusoidally alternating concave parts and convex parts.

It should be noted here that when the thickness of a turbine airfoil of a gas turbine engine is decreased in order to reduce the weight of the airfoil without changing the material thereof, it is necessary to increase its stagger angle $\gamma$ (see FIG. 1), but since the curvature of the front half on the upper face of the airfoil increases with an increase in the stagger angle $\gamma$, the flow rate on the upper face of the airfoil accelerates and decelerates rapidly and, in particular, in the case of a high load blade having a high rotor inlet relative Mach number, a shock wave is generated beyond a critical Mach number, and as a result there is the problem that the pressure loss increases.

DISCLOSURE OF THE INVENTION

The present invention has been carried out in view of the above-mentioned circumstances, and it is an object of the present invention to suppress the occurrence of a shock wave when the stagger angle is increased as a result of decreasing the thickness of a turbine airfoil of a gas turbine engine, thereby preventing any increase in the pressure loss.

In order to accomplish the above-mentioned object, in accordance with the present invention, there is proposed a gas turbine engine comprising turbine airfoils disposed in a radial direction in an annular gas passage defined by an inner peripheral wall and an outer peripheral wall, characterized in that a cross section in the axial direction along a connecting section of the inner peripheral wall or the outer peripheral wall where the wall is connected to the turbine airfoil has a concave part on a front edge side having a negative curvature relative to the direction of flow of gas and a convex part on a rear edge side having a positive curvature relative to the direction of flow of gas.

Furthermore, in addition to the above-mentioned arrangement, there is proposed a gas turbine engine wherein the height of the convex part is at most 10% of the length, in the radial direction, of the gas passage.

Moreover, in addition to the above-mentioned arrangement, there is proposed a gas turbine engine wherein the cross section in the axial direction along the connecting section has at least one point of inflection between the front edge and the rear edge.

Furthermore, in addition to the above-mentioned arrangement, there is proposed a gas turbine engine wherein, among the at least one point of inflection, the point of inflection that is the closest to the front edge side is positioned forward relative to the central position of the chord of the turbine airfoil.

Moreover, in addition to the above-mentioned arrangement, there is proposed a gas turbine engine wherein the absolute value of the negative curvature of the concave part is smaller than the absolute value of the positive curvature of the convex part.

Furthermore, in addition to the above-mentioned arrangement, there is proposed a gas turbine engine wherein the axial position of the concave part is set so that the axial position of a minimum negative pressure point that is the closest to the front edge of the turbine airfoil connected to a flat connecting section is present within the range of the concave part.

Moreover, in addition to the above-mentioned arrangement, there is proposed a gas turbine engine wherein the front end of the concave part is positioned to the rear of the front edge.

When the thickness of the turbine airfoil of the gas turbine engine is decreased in order to reduce the weight, the stagger angle required increases, the flow rate of combustion gas on the upper face of the front half of a blade main body accelerates and decelerates rapidly and, in particular, in the case of a high load blade having a high rotor inlet relative Mach number, the flow rate reaches a critical Mach number, thus generating a shock wave and thereby causing a large pressure loss and degrading the performance of the gas turbine engine. However, in accordance with the present invention, since the cross section in the axial direction along the connecting section of the inner peripheral wall or the outer peripheral wall of the gas turbine engine where the wall is connected to the turbine airfoil has a concave part on the front edge side and a convex part on the rear edge side via a point of inflection, the concave part having a negative curvature relative to a direction of flow of gas, and the convex part having a positive curvature, the flow rate on the upper face of the blade main body can be reduced in the concave part on the front edge side, thus suppressing generation of a shock wave, and the flow rate can be increased in the convex part on the rear edge side following the concave part, thus smoothly changing the flow rate on the upper face of the blade main body and thereby minimizing the pressure loss. In this way, the thickness of the blade main body can be reduced while maintaining the performance of the gas turbine engine, thereby contributing to a reduction in weight.

This effect can be exhibited even more strongly by making the height of the convex part at most 10% of the length, in the radial direction, of the gas passage, positioning the point of inflection between the concave part and the convex part so as to be forward of the central position of the chord, making the absolute value of the negative curvature of the concave part smaller than the absolute value of the positive curvature of the convex part, arranging for the minimum negative pressure point that is the closest to the front edge of the conventional turbine airfoil to be present within the range of the concave part, and positioning the front end of the concave part so as to be to the rear of the front edge.

BRIEF DESCRIPTION OF THE DRAWINGS

FIG. 1 and FIG. 2 show one embodiment of the present invention.

FIG. 1 is a diagram showing the shape of a turbine blade of a gas turbine engine.

FIG. 2 is a diagram showing the shape of an inner wall face along the chord of the turbine blade, the curvature of the inner wall face, and speed distribution on the blade face.

BEST MODE FOR CARRYING OUT THE INVENTION

Figure 1:
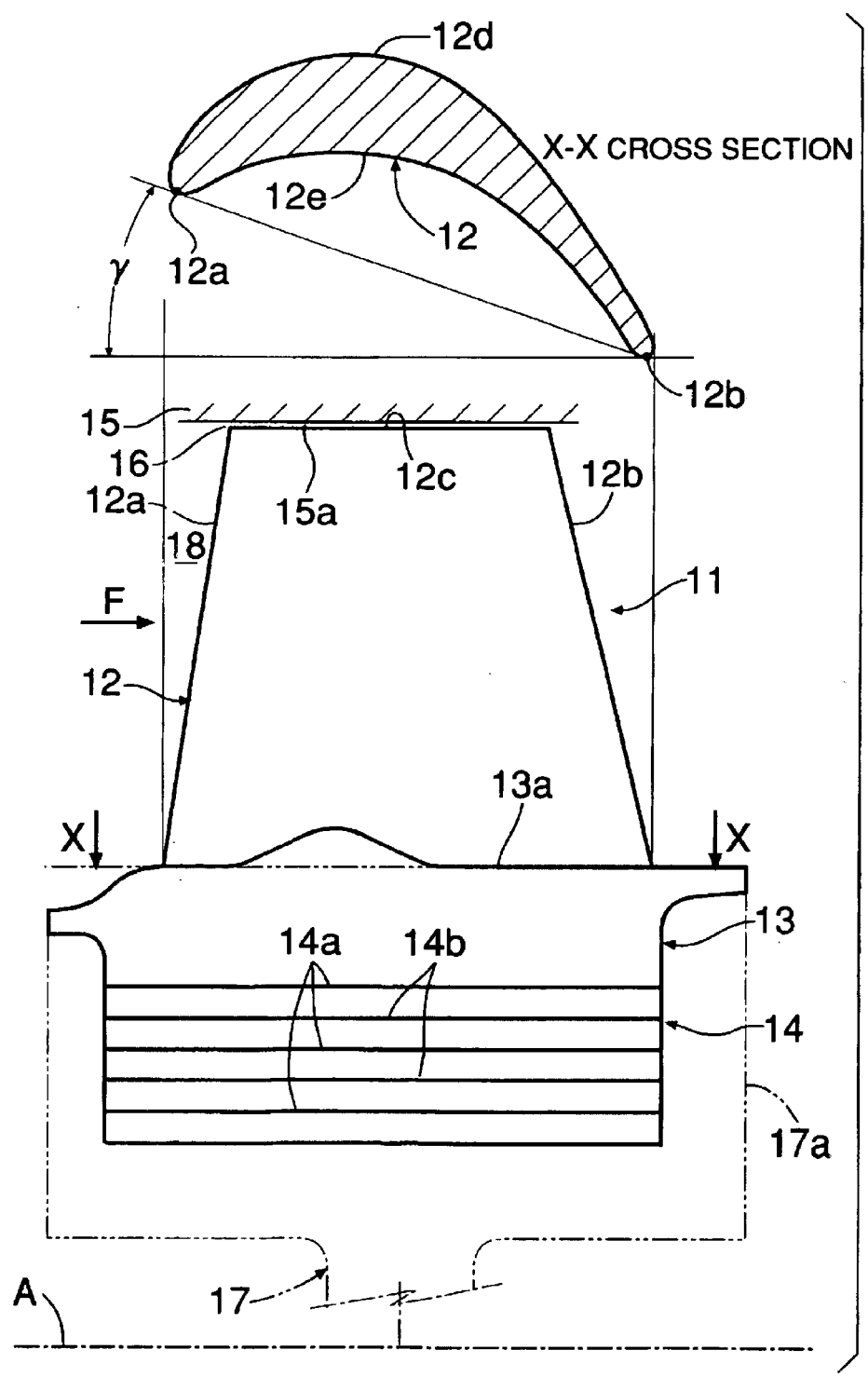

A mode for carrying out the present invention is explained below by reference to an embodiment of the present invention illustrated in attached drawings.

FIG. 1 and FIG. 2 show one embodiment of the present invention.

FIG. 1 shows a turbine blade 11 of an axial-flow gas turbine engine, and the turbine blade 11 is formed from a blade main body 12 positioned outward in the radial direction, a blade end wall 13 positioned inward in the radial direction relative to the blade main body 12, and a blade mounting part 14 positioned inward in the radial direction relative to the blade end wall 13. The blade shape of the root part (a part adjoining the blade end wall 13) of the blade main body 12 shown as the cross section X—X in FIG. 1 comprises a front edge 12a, a rear edge 12b, an upper face 12d, and a lower face 12e, and a straight line joining the front edge 12a and the rear edge 12b has a comparatively large stagger angle γ relative to the direction of the axis A of the gas turbine engine.

The stagger angle γ of the blade main body 12 of this embodiment is set so as to be large compared with a conventional stagger angle γ of 0° to 20°. Setting the stagger angle γ so as to be large compared with the conventional stagger angle in this way makes it possible for the blade thickness of the blade main body 12 to be thin, and as a result the weight of the turbine blade 11 can be reduced by 20% relative to the conventional turbine blade without changing the material.

A tip 12c on the radially outer end of the blade main body 12 faces an annular outer peripheral wall 15a of an outer casing 15 with a slight tip clearance 16. An annular hub 17a is formed on the outer circumference of a blade disc 17 supported rotatably around the axis A of the gas turbine engine, and a large number of the blade mounting parts 14 of the turbine blades 11 are mounted radially on the hub 17a. In order to withstand a large centrifugal force acting on the turbine blade 11, the blade mounting part 14 has a plurality of alternating ridges 14a and grooves 14b extending in the direction of the axis A of the gas turbine engine, and these ridges 14a and grooves 14b interlock with the hub 17a via concavo-convex engagement.

When a large number of the turbine blades 11 are mounted on the hub 17a of the blade disc 17, the blade end walls 13 of the turbine blades 11 extend integrally in the circumferential direction, thus forming an annular inner peripheral wall 13a. An annular gas passage 18 is formed between the outer peripheral wall 15a and the inner peripheral wall 13a, and the turbine blades 11 are disposed within the gas passage 18 through which combustion gas flows in the direction of the arrow F. Stator vanes, which are not illustrated, are disposed on the front side and the rear side of the turbine blades 11 in the axial direction.

As is clear from FIG. 2, a part of a cross section in the axial direction of the annular inner peripheral wall 13a, which is formed from the blade end wall 13 of the turbine blade 11, is formed from a curve. That is, the cross section in the axial direction of the inner peripheral wall 13a includes, from the front edge 12a side to the rear edge 12b side, a first straight line part 19, a first concave part 20, a convex part 21, a second concave part 22, and a second straight line part 23. The first concave part 20 and the second concave part 22 have negative curvatures and are concave toward the axis A, and the convex part 21 has a positive curvature and is convex away from the axis A. A first point of inflection a is present in a part where the curvature changes from negative to positive, and a second point of inflection b is present in a part where the curvature changes from positive to negative. The curvature on the upper face 12d of the blade main body 12 is positive in the whole region from the front edge 12a to the rear edge 12b.

Characteristic features in the cross section in the axial direction of the inner peripheral wall 13a in the present embodiment are that the first concave part 20 and the convex part 21 are positioned continuously to the rear of the first straight line part 19 following the front edge 12a, and that a minimum negative pressure point that is the closest to the front side of the conventional blade main body, which has a flat inner peripheral wall 13a on which the first concave part 20, the convex part 21, and the second concave part 22 are not formed, would be present within the range of the first concave part 20 (the range from a point d at the front end to the point a at the rear end). The deepest point c of the first concave part 20 (at which the distance from a straight line joining the front end d and the rear end a of the first concave part 20 becomes a maximum) is desirably positioned in the vicinity of the above-mentioned minimum negative pressure point. Moreover, the first inflection point a is positioned forward of the 50% position of the chord (the intermediate position between the front edge 12a and the rear edge 12b), and the absolute value of the negative curvature of the first concave part 20 is set so as to be smaller than the absolute value of the positive curvature of the convex part 21. It is appropriate for the height of the convex part 21 to be at most 10% of the radial length of the gas passage 18, that is, the distance between the inner peripheral wall 13a and the outer peripheral wall 15a.

It should be noted here that when the stagger angle γ is increased by reducing the thickness of the blade main body 12 in order to decrease the weight of the turbine blade 11, as shown by the broken line in the graph of the speed distribution on the blade upper face 12d in FIG. 2, the speed distribution of combustion gas on the upper face 12d of the blade main body 12 rapidly increases and then rapidly decreases, thereby generating a large pressure loss.

However, in the present embodiment, since in the cross section in the axial direction of the inner peripheral wall 13a of the blade end wall 13, the first concave part 20 and the convex part 21 are continuous, the flow of the combustion gas can be diffused in the radial direction in the first concave part 20, thus suppressing a rapid increase in the flow rate and thereby preventing the generation of a shock wave. Furthermore, the flow rate of the combustion gas is increased in the convex part 21 following the first concave part 20, as shown by a solid line in the graph of the speed distribution on the blade upper face 12d in FIG. 2, and the speed distribution of the combustion gas on the upper face 12d of the blade main body 12 can be increased smoothly, thereby decreasing the pressure loss.

In this way, by changing only the shape of the cross section in the axial direction of the inner peripheral wall 13a of the blade end wall 13 of the turbine blade 11, rapid changes in the speed distribution on the upper face 12*d* of the blade main body 12 can be suppressed even when increasing the stagger angle γ, thereby contributing to a reduction in weight by decreasing the thickness of the blade main body 12 while ensuring the performance of the gas turbine engine by minimizing the pressure loss.

An embodiment of the present invention has been explained above, but the present invention can be modified in a variety of ways without departing from the spirit and scope thereof.

For example, the turbine blade 11 is illustrated as a turbine airfoil in the embodiment, but the present invention can be applied to a stator vane of a gas turbine engine in the same manner. In this case, the present invention can be applied to either or both of an inner peripheral wall connected to the radially inner end of the stator vane and an outer peripheral wall connected to the radially outer end of the stator vane.

Furthermore, as shown by the solid line in the graph showing the speed distribution on the blade upper face 12*d* in FIG. 2, a rapid change is observed in the flow rate of combustion gas in the vicinity of the 70% position of the chord, but it is also possible to further reduce the pressure loss by increasing the absolute value of the negative curvature of the second concave part 22 and enlarging the range of the second convex part 22 toward the rear edge, thus smoothing the change in the flow rate in the vicinity of the 70% position of the chord.

Industrial Applicability

The present invention can be applied to an axial-flow gas turbine engine for an airplane, for stationary use, and for any other purpose.

What is claimed is:

1. A gas turbine engine comprising turbine airfoils disposed around an axis of the engine in a radial direction in an annular gas passage defined by an inner peripheral wall and an outer peripheral wall, wherein a cross section taken along a plane passing through the axis of the engine, of a connecting section of the inner peripheral wall or the outer peripheral wall where the wall is connected to the turbine airfoil has a concave part on a front edge side having a negative curvature which is concave towards the axis of the engine and a convex part on a rear edge side having a positive curvature which is convex towards the axis of the engine.

2. The gas turbine engine according to claim 1, wherein the height of the convex part is at most 10% of the length, in the radial direction, of the gas passage.

3. The gas turbine engine according to claim 1, wherein the cross section of the connecting section has at least one point of inflection between the front edge and the rear edge.

4. The gas turbine engine according to claim 3, wherein, among said at least one point of inflection, the point of inflection that is the closest to the front edge side is positioned forward relative to the central position of the chord of the turbine airfoil.

5. The gas turbine engine according to claim 1, wherein the absolute value of the negative curvature of the concave part is smaller than the absolute value of the positive curvature of the convex part.

6. The gas turbine engine according to claim 1, wherein the axial position of the concave part is set so that the axial position of a minimum negative pressure point that is the closest to the front edge of the turbine airfoil which is connected to a flat connecting section is present within the range of the concave part.

7. The gas turbine engine according to claim 1, wherein the front end of the concave part is positioned to the rear of the front edge.

\* \* \* \* \*